United States Patent
Farag et al.

(10) Patent No.: US 11,290,220 B2
(45) Date of Patent: Mar. 29, 2022

(54) SELECTION OF PHYSICAL UPLINK CONTROL CHANNEL RESOURCES

(71) Applicant: Nokia Technologies Oy, Espoo (FI)

(72) Inventors: Emad Farag, Murray Hill, NJ (US); Volker Braun, Stuttgart (DE); Karol Schober, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/367,942

(22) Filed: Mar. 28, 2019

(65) Prior Publication Data

US 2019/0313400 A1 Oct. 10, 2019

Related U.S. Application Data

(60) Provisional application No. 62/653,805, filed on Apr. 6, 2018.

(51) Int. Cl.
*H04L 1/18* (2006.01)
*H04W 72/04* (2009.01)
*H04L 5/00* (2006.01)

(52) U.S. Cl.
CPC .......... *H04L 1/1861* (2013.01); *H04L 1/1896* (2013.01); *H04L 5/0055* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 9,807,740 B2* | 10/2017 | Oizumi | H04W 72/00 |
| 2010/0260124 A1* | 10/2010 | Noshio | H04L 5/0055 370/329 |
| 2011/0211538 A1* | 9/2011 | Kakura | H04W 72/042 370/329 |
| 2011/0243090 A1 | 10/2011 | Grovlen et al. | |
| 2011/0292900 A1* | 12/2011 | Ahn | H04L 5/0053 370/329 |
| 2013/0039290 A1* | 2/2013 | Harrison | H04L 1/1861 370/329 |
| 2013/0083751 A1* | 4/2013 | Papasakellariou | H04W 72/0406 370/329 |
| 2015/0208408 A1* | 7/2015 | Berggren | H04L 1/1861 370/329 |
| 2016/0037543 A1 | 2/2016 | Papasakellariou | |
| 2017/0373793 A1* | 12/2017 | Yerramalli | H04L 1/0052 |
| 2018/0132264 A1* | 5/2018 | Jung | H04L 1/1812 |

OTHER PUBLICATIONS

"Remaining issues for resource allocation for PUCCH", Qualcomm Incorporated, 3GPP TSG RAN WG1 Meeting #92, R1-1802840, Mar. 2018, 9 pages.

(Continued)

*Primary Examiner* — Lonnie V Sweet
(74) *Attorney, Agent, or Firm* — Harrington & Smith

(57) ABSTRACT

A method and apparatus for implicitly determining a PUCCH resource. The invention allows for flexible selection of a PUCCH resource in the PUCCH resource subset for configurations of PDCCH resources without collisions through the use of indices for control channel element subsets.

14 Claims, 10 Drawing Sheets

(56) References Cited

OTHER PUBLICATIONS

"Remaining issues for PUCCH resource allocation", ZTE, Sanechips, 3GPP TSG RAN WG1 Meeting #92, R1-1801628, Mar. 2018, 4 pages.
"Summary of offline discussions on PUCCH resources allocation", Oppo, 3GPP TSG RAN WG1 Meeting AH 1801, R1-1801152, Jan. 2018, 10 pages.
"PUCCH resources allocation", CATT, 3GPP TSG RAN WG1 Meeting #92, R1-1801734, Feb. 2018, 7 pages.

* cited by examiner

EXAMPLE OF m' DETERMINATION BASED ON THE FIRST METHOD

| m' | m=0 | m=1 | m=2 | m=3 | m=4 | m=5 |
|---|---|---|---|---|---|---|
| AL8 | 0 | 1 | – | – | – | – |
| AL4 | 2 | 3 | – | – | – | – |
| AL2 | 4 | 5 | 6 | 7 | 8 | 9 |
| AL1 | 10 | 11 | 12 | 13 | 14 | 15 |

FIG.3

PUCCH RESOURCE r DETERMINATION BASED ON THE FIRST METHOD

| r | m=0 | m=1 | m=2 | m=3 | m=4 | m=5 |
|---|---|---|---|---|---|---|
| AL8 | 0 | 1 | – | – | – | – |
| AL4 | 2 | 3 | – | – | – | – |
| AL2 | 0 | 1 | 2 | 3 | 0 | 1 |
| AL1 | 2 | 3 | 0 | 1 | 2 | 3 |

FIG.4

DETERMINATION OF PDCCH CANDIDATE INDEX m' AND PUCCH RESOURCE r BASED ON THE FIRST EXAMPLE METHOD

| PDCCH MAPPING ORDER OF ALs | 8 | 4 | 2 | 1 | 2 | 1 | 2 | 1 | 8 | 4 | 2 | 1 | 2 | 1 | 2 | 1 |
|---|---|---|---|---|---|---|---|---|---|---|---|---|---|---|---|---|
| m' ACCORDING TO MAPPING ORDER | 0 | 1 | 2 | 3 | 4 | 5 | 6 | 7 | 8 | 9 | 10 | 11 | 12 | 13 | 14 | 15 |
| TAGGED PUCCH RESOURCE r | 0 | 1 | 2 | 3 | 0 | 1 | 2 | 3 | 0 | 1 | 2 | 3 | 0 | 1 | 2 | 3 |
| m' FROM HIGHEST AL TO LOWEST AL | 0 | 2 | 4 | 10 | 5 | 11 | 6 | 12 | 1 | 3 | 7 | 13 | 8 | 14 | 9 | 15 |
| TAGGED PUCCH RESOURCE r | 0 | 2 | 0 | 2 | 1 | 3 | 2 | 0 | 1 | 3 | 3 | 1 | 0 | 2 | 1 | 3 |

FIG.9

SELECTION OF PHYSICAL UPLINK CONTROL CHANNEL RESOURCES

CROSS-REFERENCE

This application claims priority under 35 U.S.C. § 119(e)(1) to U.S. Provisional Patent Application No. 62/653,805, filed Apr. 6, 2018 which is hereby incorporated by reference in its entirety.

BACKGROUND

Technical Field

The exemplary and non-limiting embodiments relate generally to Physical Uplink Control Channel resources and, more particularly, to selection of those resources.

Brief Description of Prior Developments

It is known to use signaling to indicate which Physical Uplink Control Channel (PUCCH) resources to use for transmission of a Hybrid Automatic Repeat Request ACKnowledgement (HARQ-ACK). U.S. patent publication Nos. 2011/0243090 A1 and 2016/0037543 A1 are hereby incorporated by reference in their entireties.

The following abbreviations that may be found in the specification and/or the drawing figures are defined as follows:

3GPP 3rd Generation Partnership Project
AL: Aggregation Level
ARI: ACK/NACK Resource Indicator
BD Blind Decode
CCE: Control Channel Element
CRC Cyclic Redundancy Check
DCI: Downlink Control Information
eNB (or eNodeB) evolved Node B (e.g., an LTE base station)
gNB 5$^{th}$ generation Node B
HARQ-ACK Hybrid Automatic Repeat Request ACKnowledgement
I/F interface
LTE long term evolution
MME mobility management entity
NCE network control element
NR New Radio
N/W network
PDCCH: Physical Downlink Control Channel
PUCCH: Physical Uplink Control Channel
RNTI Radio Network Temporary Identifier
RRH remote radio head
Rx receiver
SGW serving gateway
Tx transmitter
UE user equipment (e.g., a wireless, typically mobile device)

BRIEF DESCRIPTION OF THE DRAWINGS

The foregoing aspects and other features are explained in the following description, taken in connection with the accompanying drawings, wherein:

FIG. 3 is a table illustrating an example of candidate index determination based upon one example method;

FIG. 4 is a table illustrating an example of PUCCH resource r determination based upon one example method;

FIG. 9 is a table illustrating an example of determination of PDCCH candidate index and PUCCH resource r based upon one example method;

DETAILED DESCRIPTION OF EMBODIMENTS

Figure 1:
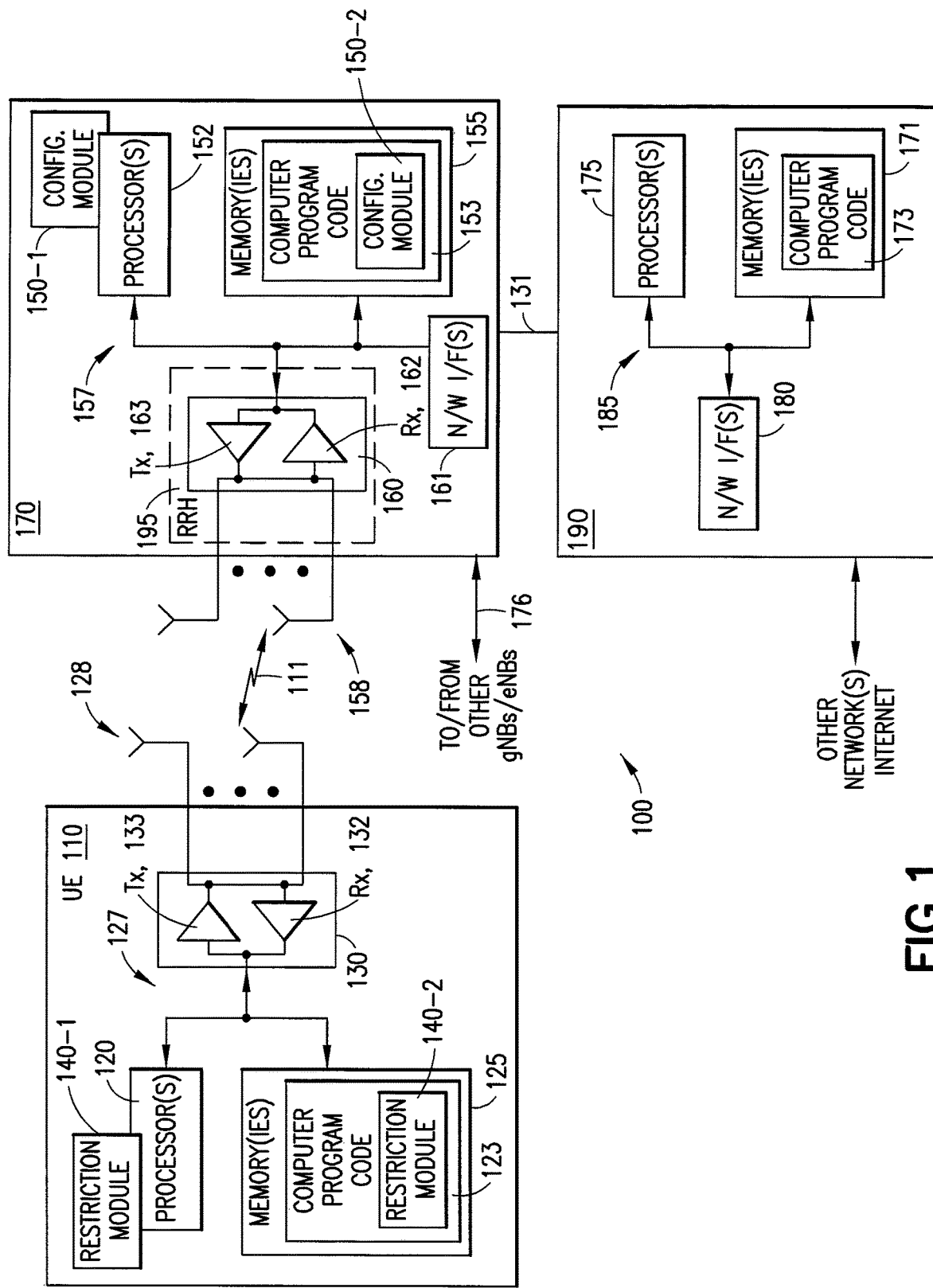
FIG. 1 is a diagram illustrating one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. The UE 110 is a wireless, typically mobile, device that can access the wireless network. The UE 110 includes one or more processors 120, one or more memories 125, and one or more transceivers 130 interconnected through one or more buses 127. Each of the one or more transceivers 130 includes a receiver (Rx) 132 and a transmitter (Tx) 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a restriction module 140, comprising one of or both parts 140-1 and/or 140-2, which may be implemented in a number of ways. The restriction module 140 may be implemented in hardware as restriction module 140-1, such as being implemented as part of the one or more processors 120. The restriction module 140-1 may be implemented also as an integrated circuit or through other hardware such as a programmable gate array. In another example, the restriction module 140 may be implemented as restriction module 140-2, which is implemented as computer program code 123 and is executed by the one or more processors 120. For instance, the one or more memories 125 and the computer program code 123 may be configured to, with the one or more processors 120, cause the UE 110 to perform one or more of the operations as described herein. The UE 110 communicates with gNB/eNB 170 (generally referred to as gNB 170 below) via a wireless link 111.

The gNB 170 is a base station (for example, for 5G/LTE) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver (Rx) 162 and a transmitter (Tx) 163. The one or more transceivers 160 are connected to one or more antennas 158. The one or more memories 155 include computer program code 153. The gNB 170 includes a configuration module 150, comprising one of or both parts 150-1 and/or 150-2, which may be implemented in a number of ways. The configuration module 150 may be implemented in hardware as configuration module 150-1, such as being implemented as part of the one or more processors 152. The configuration module 150-1 may be implemented also as an integrated circuit or through other hardware such as a programmable gate array. In another example, the configuration module 150 may be implemented as configuration module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, for example, link 176. The link 176 may be wired or wireless or both and may implement, for example, an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of an gNB. That is, there can be multiple cells per gNB. For instance, there could be three cells for a single gNB carrier frequency and associated bandwidth, each cell covering one-third of a 360 degree area so that the single gNB's coverage area covers an approximate oval or circle. Furthermore, each cell can correspond to a single carrier and an gNB may use multiple carriers. So if there are three 120 degree cells per carrier and two carriers, then the gNB has a total of 6 cells.

The wireless network 100 may include one or more network control elements (NCE) 190 that may include MME (Mobility Management Entity) and/or SGW (Serving Gateway) functionality, and which provides connectivity with a further network, such as a telephone network and/or a data communications network (for example, the Internet). The gNB 170 is coupled via a link 131 to the NCE 190. The link 131 may be implemented as, for example, an S1 interface. For 5G wireless systems, the link 131 may represent a 5G interface, such as NG2 or NG3 for example. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

Those skilled in the art will appreciate that the various network elements shown in FIG. 1 may be implemented differently in future wireless network, such as 5G wireless networks. For example, the terms NCE, MME, and SGW are terms generally used for the core elements in a LTE network. In contrast to LTE, future wireless networks may carry out network functions (NFs) by a plurality of cooperating devices. The different NFs, may include for example, Access and Mobility Function (AMF), Session Management Function (SMF), Policy Control Function (PCF), Application Function (AF), Authentication Server Function (AUSF), User Plane Function (UPF), and User Data Management (UDM). These NFs may be a virtualized function instantiated on an appropriate platform, such as a cloud infrastructure. For example, certain protocols (such as non real-time protocols for example) may be performed by one or more centralized units (CUs) in a cloud infrastructure, while one or more distributed units (DUs) operate the remaining protocols (e.g. real-time protocols) of the 5G radio interface. In this way, the various NFs may be split between CUs and DUs. Together a CU, underlying DUs, and RRHs may be considered as forming a logical base station (which may be represented by gNB 170 in FIG. 1 for example).

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 or 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various example embodiments of the UE 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein may be used in regard to 3GPP New Radio (NR) physical layer design and related 3GPP work item (WI) (RP-170855). An objective of this work item phase is to specify the NR functionalities for enhanced mobile broadband (eMBB) and ultra-reliable low latency communications (URLLC), such as described in TS 38.913 for example. This may be for considering frequency ranges up to 52.6 GHz and considering forward compatibility and introduction of new technology components for new use cases for example. The features as described herein may be used for an implicit mapping rule for selection of the PUCCH resources in a PUCCH resource set. Features as described herein may also address the issue of Blind Decode (BD) dropping.

When there are 32 PUCCH resources in a PUCCH resource set, 5 bits may be used to indicate which PUCCH resource to use for transmission of HARQ-ACK. However, there are only three bits in the DCI for carrying the ACK/NACK Resource Indicator (ARI) in NR. The 32 PUCCH resources can be divided into 8 PUCCH resource subsets with each PUCCH resource subset containing 4 PUCCH resources. The 3-bit ARI can be used to select one of the 8 PUCCH resource subsets. Implicit indication may then be used to select one of the 4 PUCCH resources in a PUCCH resource subset. At least the CCE index may be used to implicitly determine the PUCCH resource. The following is one agreement:

3-bit ARI for DCI 1_0 and DCI 1_1
  At least 8 (up to 32) PUCCH resources can be configured in a resource set with $N_{UCI} \leq 2$
    CCE-index-based implicit mapping is additionally used when >8 resources are configured.
    Note: Increasing RRC value range from 8 to 32
  8 PUCCH resources are configured in a resource set with $N_{UCI} > 2$.
    No implicit mapping Concerning PDCCH, a major open issue in NR standard is in which order the PDCCH candidates will be assigned. Further, some candidates may not be mapped, if the monitoring capabilities of the UE would be exceeded; this is also called BD dropping. An agreement has been made to:

Specify PDCCH candidate mapping rules.
  PDCCH candidates are mapped to search-space-sets until either or both limit(s) of (number of blind decodes, CCEs for channel estimation) is/are met at least with the following rule
    SS type order, e.g. CSS before USS
    For Further Study: further rule within a search space set/type The following schemes have been proposed based on the CCE index for implicitly determining the PUCCH resource:

In [R1-1802840, Remaining issues for resource allocation for PUCCH, Qualcomm, Athens Greece, February 2018], the following mapping rule has been proposed:
  Mapping from the starting CCE index according to the following equation:

$$r = \text{Mod}\left(\frac{C}{L}, M\right)$$

M is the number of PUCCH resources in the resource sub-set indicated by ARI bits
  C is the starting CCE index of the lastly received DCI within the ACK bundling window.
    In case of CA, C is the starting CCE index of the DCI received on the smallest CC in the last slot within the ACK bundling window
  L is the aggregation level of the PDCCH associated with C In [R1-1801628, Remaining issues for PUCCH resource allocation, ZTE, Sanechips, Athens Greece, February 2018], the following mapping rule has been proposed:

The PUCCH resource index within a subset is implicitly indicated by $$i = \left(\frac{n_{CCE}}{L} + c(n_s)\right) \mod 2$$

Where, $c(n_s)$ is a pseudo random value derived from the slot number ($n_s$), and $n_{CCE}$ is the starting CCE index. The above formula is for the case the PUCCH resource subset has two PUCCH resources.

Both of these schemes rely on using the CCE start index divided by the aggregation level, modulo the number of PUCCH resources in a PUCCH resource subset to find the resource within the PUCCH resource subset to use for transmitting PUCCH.

The PUCCH resource subset is determined based on the following hashing formula [TS 38.213 section 10.1]:

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i$$

This hashing formula is the same as EPDCCH formula in LTE (but in principle features as described herein may be applied with other hashing function as well). The set of CCEs in a Control-resource set (CORESET) is split into $M_{p,s,max}^{(L)}$ sub-bands, where $M_{p,s,max}^{(L)}$ is number of configured PDCCH candidates for AL L in search-space-set s in CORESET p. (The maximum of $M_{p,s}^{(L)}$ values is taken across component carriers in case of cross-carrier scheduling, so $M_{p,s,max}^{(L)}$ can be replaced by $M_{p,s}^{(L)}$ herein.)

There is a problem with these proposed formulas and the above solutions. They are not able to flexibly select any PUCCH resource within the PUCCH resource subset for many configurations of $M_{p,s}^{(L)}$. For example, if we take L=2, $N_{CCE,p}=32$, $M_{p,s,max}^{(L)}=4$, and assuming for illustration simplicity other parameters are 0, in this case the start CCEs are 0, 8, 16 and 24. It is not possible to use implicit mapping based on formula $$\text{Mod}\left(\frac{CCE_{start}}{2}, 4\right).$$

In this example, the number $M_{p,s,max}^{(L)}$ of PDCCH candidates of aggregation level L is equal to the number M of PUCCH resources in the PUCCH resource sub-set indicated by ARI bits, and number of CCEs in the CORESETs is divisible by M and L. In other words, the implicit mapping of PUCCH resources may lead to collisions if the number of PDCCH candidates is not well configured. In turn, this implies that the PDCCH configuration would need to take care to obtain proper implicit mapping rules for the PUCCH; this resulting in configuration restrictions at gNB. Obviously, this is not a good solution.

Methods are described herein for implicitly determining the PUCCH resource. Features as described herein may provide collision-free solutions for the implicit mapping of PUCCH resources; irrespective of how PDCCH is configured. Multiple alternative solutions for implicitly selecting the PUCCH resource are described below.

A first example method is to introduce a candidate index m' across aggregation levels (ALs), for example, starting from highest AL (AL16) to lowest AL (AL1), (or vice versa, or in principle any other candidate ordering) of a search space set:

The PUCCH resource in the PUCCH resource subset of size M is selected according to the following formula: $r=(m'+Y_{p,n_s,f}^\mu) \mod M$, where mod denotes modulo operation, and $Y_{p,n_s,f}^\mu$ is a pseudo-random variable updated every slot.

In generalized form, the index m' is obtained as m'=0, 1, . . . , $\Sigma_L M_{p,s}^{(L)}-1$, where $M_{p,s}^{(L)} \in \{0, 1, 2, 3, 4, 5, 6, 8\}$ denotes the configured number of PDCCH candidates of aggregation level L for search space set s associated with CORESET p. The association of index m' to the AL L is formally given by m'=$\Sigma_{l>L} M_{p,s}^{(l)}+m$, where m=$m_{s,n_{CI}}$=0, 1, . . . , $M_{p,s}^{(L)}$, and assuming that the ordering of m' is from highest to lowest AL.

If PDCCH candidates of two different search-space-sets, configured to UE 110 for monitoring, overlap in the same CORESET, the m' is determined given m (where m is a PDCCH candidate index) in the search-space set with the lowest/highest index. The highest/lowest index noted above refers to the search space set index s. s is not illustrated in FIG. 2. This method resolves ambiguity when UE 110 finds PDCCH on a candidate which belongs to two different search-space-sets. Preferably, in such case, the UE 110 is enabled to identify to which search-space-set the candidate belongs. This may be done, for example, via DCI format or format size, or RNTI used for CRC check, or via an identifier carried in DCI.

The determination of m' from m is performed at both the gNB 170 and the UE 110

Figure 2:
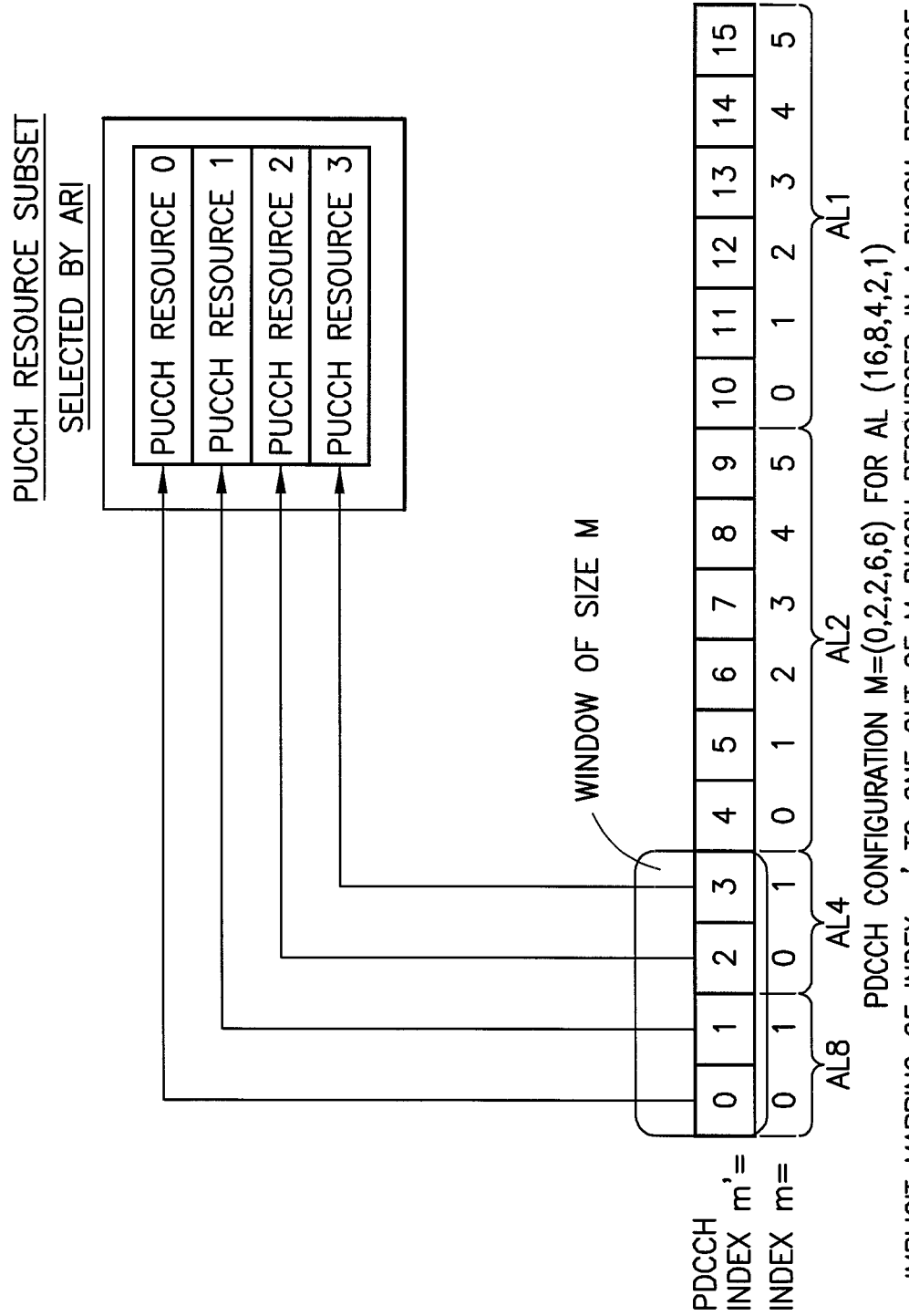
FIG. 2 is a diagram illustrating some features in one example method of implicit mapping.

The portion of FIG. 2 labeled "PUCCH Resource Subset Selected by ARI" shows how PUCCH resources are mapped to a subset of m'. FIG. 2 also shows mapping of m to m' for one search space set.

In a variation, the random variable $Y_{p,n_s,f}^\mu$ used in the PDCCH hashing function can be set to 0 for some/all users.

In another variation, another random variable may be introduced to replace $Y_{p,n_s,f}^\mu$. The random variable may be updated every slot, such as with $Y_{p,n_s,f}^\mu$, or it may be updated on a time scale other than a slot.

With this example method, the base station determines the candidate index to use for the transmission of PDCCH (this implicitly signals a PUCCH resource). The UE 110 receives a PDCCH in the search, and then determines its candidate index to determine implicitly the PUCCH resource.

A second example method is to divide the CCEs allocated to the PDCCH search space into M sub-bands and, depending on the sub-band of the starting CCE, a PUCCH resource is selected. M is the number of PUCCH resources in a PUCCH resource subset. This can be described by the following formula:

$$r = \left\lfloor \frac{CCE_{start}}{N_{CCE,p}/M} \right\rfloor$$

A third example method is a hybrid of the first and second methods.

Example of the First Method

FIG. 2 depicts the implicit mapping of index m' to one out of M PUCCH resources in a PUCCH resource subset.

The PUCCH configuration is shown in the upper part of FIG. 2. M=4 PUCCH resources numbered 0, 1, 2, and 3 are configured in the PUCCH resource subset selected by the ARI. The ARI is transmitted to the UE 110 within the DL scheduling grant (DCI) scheduled on PDCCH. The PDCCH candidate configuration is shown on the bottom of FIG. 2. Assuming that the number of configured candidates per aggregation level is (0, 2, 2, 6, 6) for ALs (16, 8, 4, 2, 1) and M=4, then the m' determination is shown in FIG. 3 and PUCCH r determination is shown in FIG. 4. Here we assume that $Y_{p,n_s,f}^\mu=0$, non-zero value would provide an additional user-specific and time-variant (i.e. slot-by-slot) shift. If multiple UEs 110 would have the same number of candidates, multi-user multiplexing to M resources is improved by user-specific $Y_{p,n_s,f}^\mu$.

FIG. 2 further shows a window of size M=4 that is applied to index m'. Within this window, the mapping of PDCCH candidate index m' to a PUCCH resource within the PUCCH resource subset selected by ARI is collision-free. Shifting the window over m' will always result in collision-free implicit mapping.

This is advantageous also for reducing the implementation complexity of the packet scheduler in gNB 170. Assume that in the PUCCH resource subset selected by ARI, one PUCCH resource is already occupied by another UE 110. Then it will be sufficient for gNB 170 to search within a window of size M for a PDCCH candidate that will not lead to a collision with the occupied PUCCH resource.

The following is an example referring to FIG. 2. UE 110 is close to cell edge and, therefore, gNB 170 would like to schedule DL grant on PDCCH with AL4 to the UE 110. The gNB 170 selects m'=2 for the UE 110. However, the implicitly tagged PUCCH resource 2 is already assigned to another UE 110. Then gNB 170 may use m'=3 with AL4 to send DL grant to the UE 110, or in case the PUCCH resource 3 is already assigned to another UE 110, the gNB 170 may use m'=1 or m'=0, both with AL8. If all four PDCCH candidates within the window lead to collisions on PUCCH, then gNB 170 does not need to search for further PDCCH candidates; irrespective of the number of PDCCH candidates configured for the UE 110.

FIG. 2 does not show the random variable $Y_{p,n_s,f}^\mu$ that can be added to m' for the implicit mapping; this number acts as a fixed offset within a slot, and is beneficial to reduce blocking on PUCCH, as already discussed above.

Example of the Second Method

Figure 5:
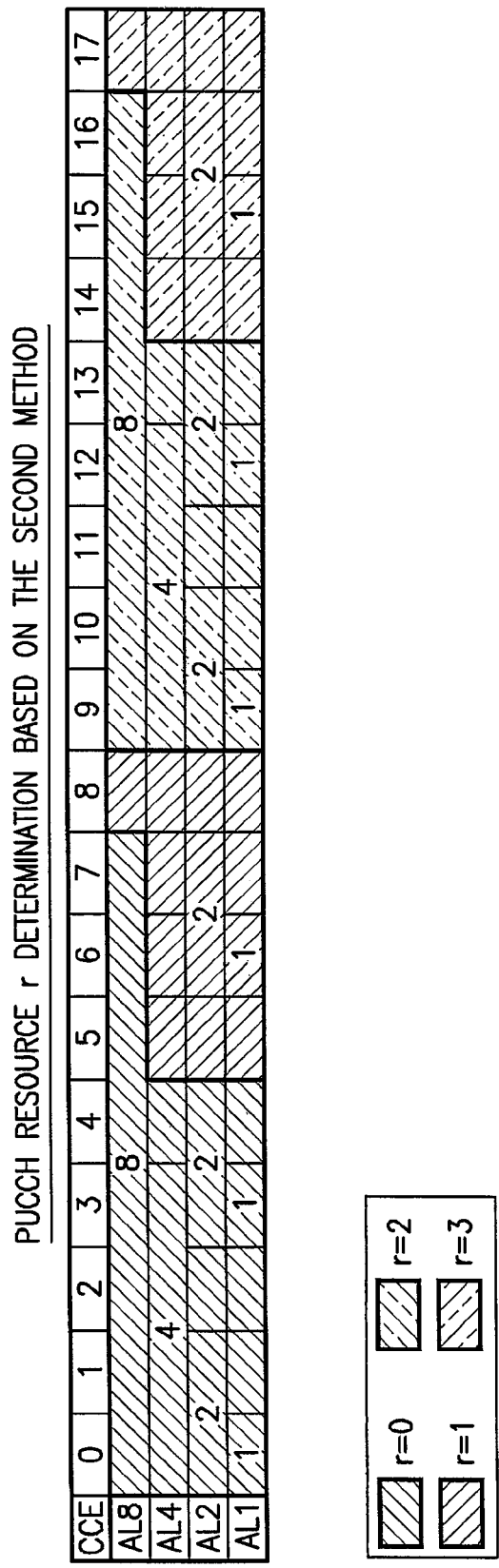
FIG. 5 is a table illustrating an example of PUCCH resource r determination based upon one example method.

Assuming that the number of candidates per aggregation level is (2, 2, 6, 6) for ALs (8, 4, 2, 1), M=4, $Y_{p,n_s,f}^\mu=0$, CORESET comprises $N_{CCE,p}=18$ CCEs. The candidates, each indicated by a different shading, correspond to r=0, 1, 2, 3, as shown in the legend in FIG. 5. This solution provides also relatively good diversity for selection of r implicitly by selecting the PDCCH candidate.

Advantages

The advantage of both of the above methods is that different candidates result in different values of r independently of CORESET and search space set configuration; unlike with the prior art. The advantage of the first method is that it would operate better for small search-space-sets comprising a small number of configured PDCCH candidates. The advantage of the second method is that it is aligned more with the current agreement; i.e. that mapping to r depends on starting CCE index of PDCCH candidate.

Examples of the Third Method

The third method combines the first and second methods:
In a first step, each PDCCH candidate is assigned to one of the M sub-bands, according to the second method and as exemplified in FIG. 5.
In a second step, the PDCCH candidates within a sub-band are numbered with index m"=0, 1, . . . , according to first method and as exemplified in FIG. 6.
In the third step, the index m" is mapped to PUCCH resource r according to the first method, as exemplified by the different box types surrounding the m" values in FIG. 6

Figure 6:
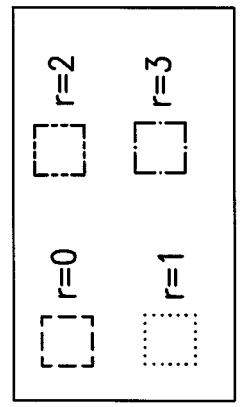
FIG. 6 is a table illustrating an example of PUCCH resource r determination based upon one example method.

In FIG. 6, the indexing is from highest AL to lowest AL within each sub-band, starting with the first sub-band.

An advantage of this third method over the second method is that within a PDCCH sub-band there are multiple PUCCH resources that can be tagged. This may be beneficial for frequency-selective scheduling of the DCI on PDCCH. The following is an example. The first sub-band is preferred for DCI transmission to a UE 110, and the first PUCCH resource (r=0) is occupied by another UE 110. With the second method, then DCI cannot be transmitted on the preferred sub-band.

An issue with the example of FIG. 6 is that the highest AL (AL8) is always tagged to the same PUCCH resource. This can easily lead to blocking, as a cell edge UE cannot be served with AL8 if the tagged PUCCH resource is already assigned to another UE 110. This can be mitigated by adding sub-band specific offsets to the index m", e.g. cyclic shift or random-offset.

More Examples of the First Method

Figure 7:
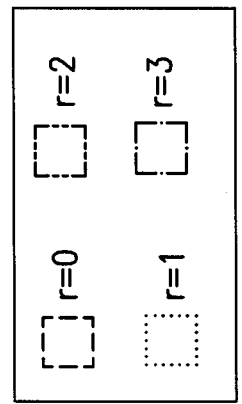
FIG. 7 is a table illustrating an example of PUCCH resource r determination based upon one example method.

A very elegant solution to solve the issues of the second and third methods is to adopt the first method, as can be seen in FIG. 7.

Figure 8:
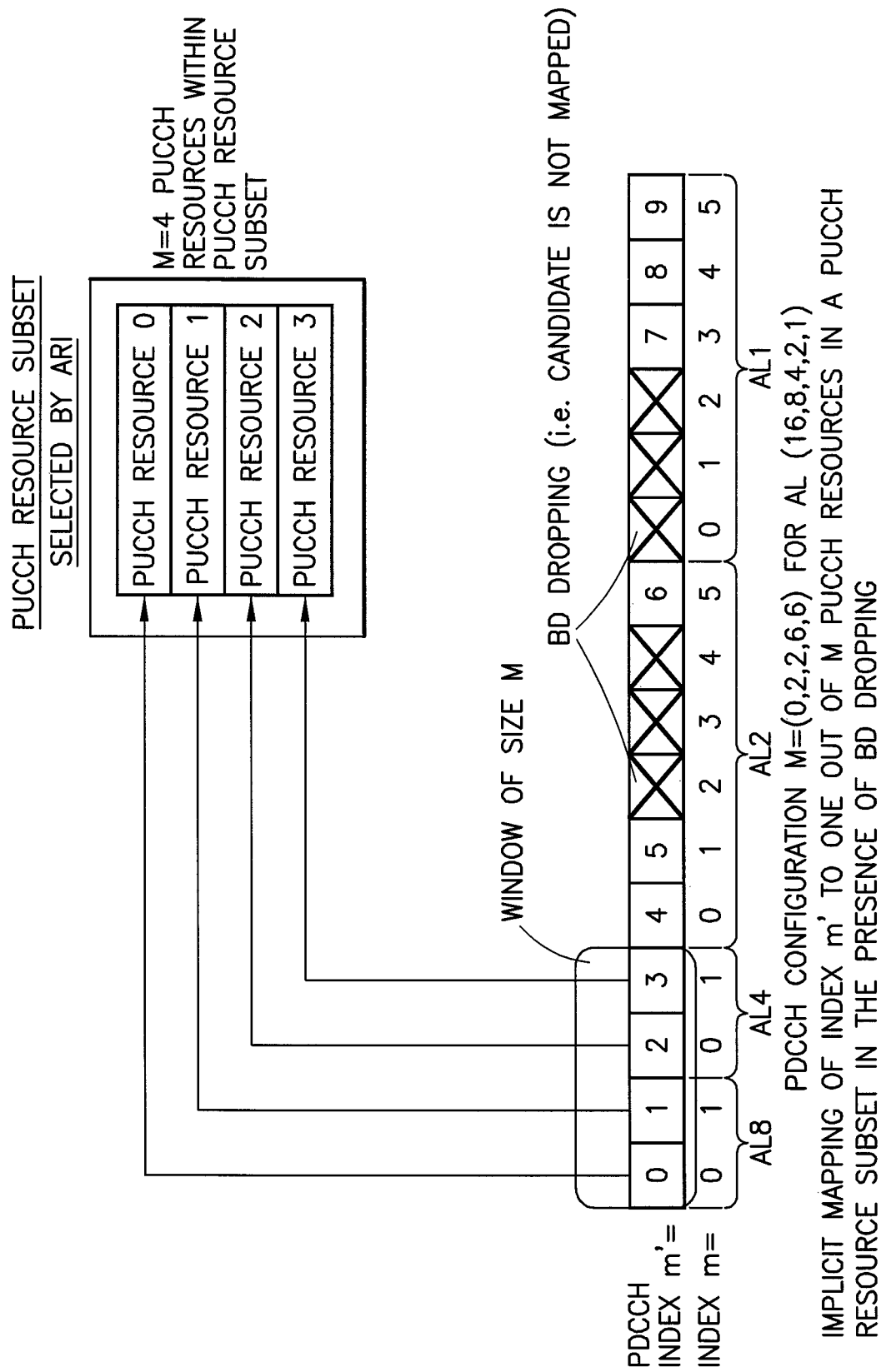
FIG. 8 is a diagram illustrating some features in one example method of implicit mapping.

In NR standard, it is still open in which order to assign the PDCCH candidates and whether or not to apply BD dropping. An example for BD dropping with the first method is shown in FIG. 8.

A first option for PDCCH assignment order could be from highest AL to lowest AL, just like in the first method. In case of BD dropping, this will reduce the number of candidates, but the implicit tagging of PUCCH resource will not introduce any additional coverage issues. Concerning the numbering of m' this could be maintained as in FIG. 2. Alternatively the numbering of m' can be modified as in FIG. 8, where index m' is only incremented if a PDCCH candidate is mapped (and m' is not incremented if a candidate is dropped/not mapped). The latter provides better tagging (less blocking).

Alternatively, PDCCH assignment order may be done according to priority rules, e.g. by defining PDCCH candidate priorities such as for example:

$$\rho(m)=m/M_{p,s}^{(L)}, m=0,1,\ldots,M_{p,s}^{(L)},$$

and mapping can be done along increasing or decreasing priorities, or the mapping order may take into account the CCE overlap between candidates across all the ALs. In this case, the assignment order may mix between the different ALs. For example, ALs may be in the following (or any other) order: 8, 4, 2, 1, 2, 1, 2, 1, 8, 4, 2, 1, 2, 1, 2, 1, as shown in the first row of FIG. 9. In this case, there is question how to assign the index m', see FIG. 9:

Index m' can be aligned with the candidate mapping order (2nd row). In the presence of BD dropping, this provides good tagging (less blocking). But in the absence of BD blocking it may be disadvantageous, e.g. in the example AL8 is always tagged to r=0 (3rd row), this may cause coverage issues.

Index m' can be from highest AL to lowest AL (4th row). This is preferable in the absence of BD dropping but may lead to suboptimum tagging in case of BD dropping.

A simple solution would be to order m' depending on the presence or severity of BD dropping, e.g. if BD dropping is present (or if BD dropping reduces BDs or BDs of highest AL by more than x %, say 50%) then the ordering of m' is aligned with the candidate assignment order (2nd row), and otherwise the ordering of m' is from highest AL to lowest AL (or vice versa) (4th row).

In one example method, the following aspects may be performed at the UE:
receiving DL assignment and extracting ARI and determining PUCCH resource subset from ARI;
determining the PDCCH candidate index m in search-space-set s in CORESET p where DL assignment has been decoded;
determining the unique index m' given the m and AL of the PDCCH candidate;
determining the PUCCH resource within the PUCCH resource subset for HARQ-ACK feedback given m', user-specific offset Y and number of PUCCH resources within a physical uplink control channel resource subset; and
transmitting the HARQ-ACK on the PUCCH resource.

Figure 10:
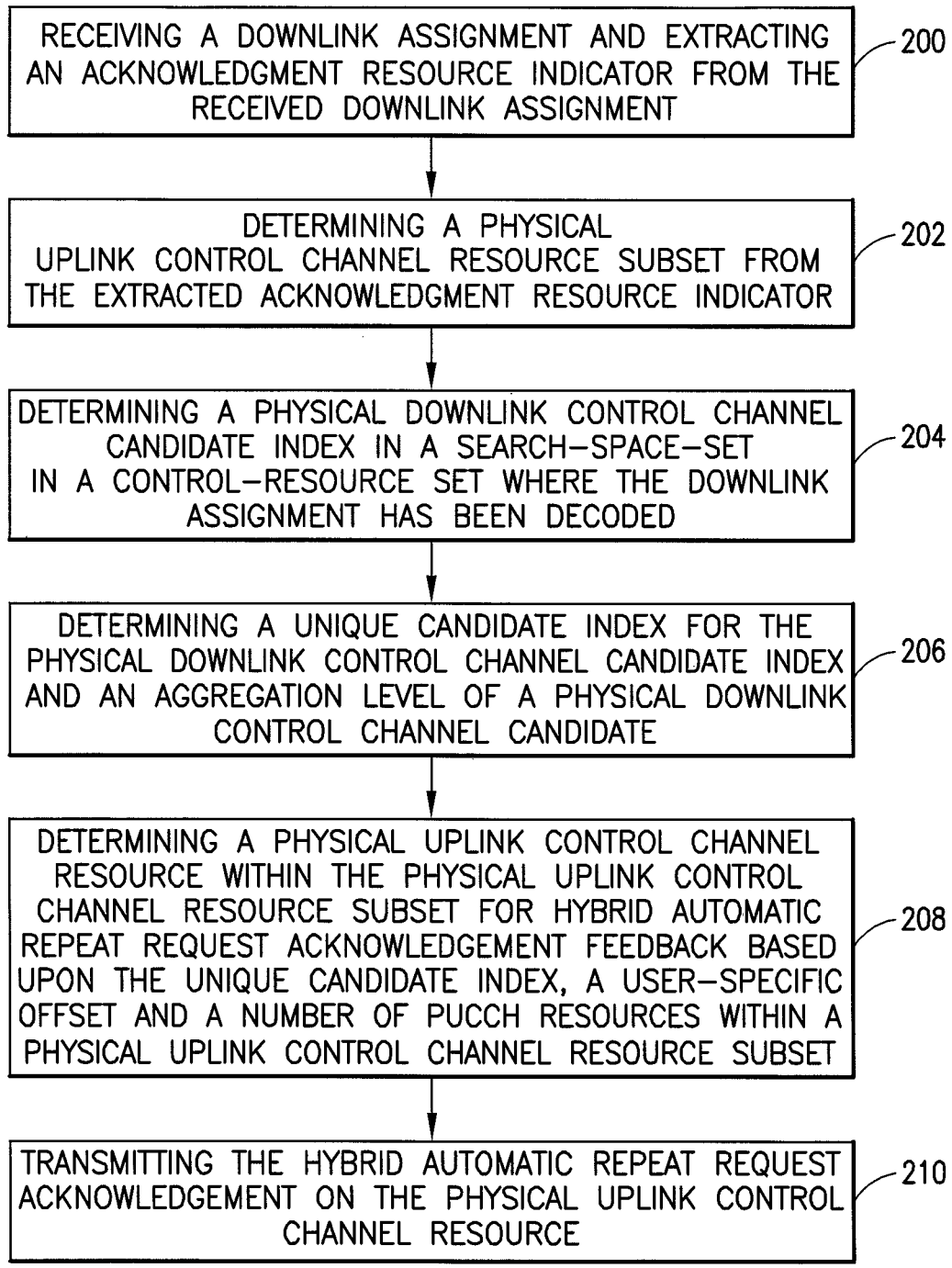
FIG. 10 is a diagram illustrating one example method.

Referring also to FIG. 10, one example method may comprise receiving a downlink assignment and extracting an ACKnowledgment resource indicator from the received downlink assignment as indicated by block 200; determining a physical uplink control channel resource subset from the extracted ACKnowledgment resource indicator as indicated by block 202; determining a physical downlink control channel candidate index in a search-space-set in a control-resource set where the downlink assignment has been decoded as indicated by block 204; determining a unique candidate index for the physical downlink control channel candidate index and an aggregation level of a physical downlink control channel candidate as indicated by block 206; determining a physical uplink control channel resource within the physical uplink control channel resource subset for hybrid automatic repeat request ACKnowledgement feedback based upon the unique candidate index, a user-specific offset and a number of PUCCH resources within the physical uplink control channel resource subset as indicated by block 208; and transmitting the hybrid automatic repeat request ACKnowledgement on the physical uplink control channel resource as indicated by block 210. The unique candidate index may be unique within a search space set. The user-specific offset may be set to 0.

In accordance with one aspect, an example embodiment may be provided in an apparatus comprising means for receiving a downlink assignment and extracting an ACKnowledgment resource indicator from the received downlink assignment; means for determining a physical uplink control channel resource subset from the extracted ACKnowledgment resource indicator; means for determining a physical downlink control channel candidate index in a search-space-set in a control-resource set where the downlink assignment has been decoded; means for determining a unique candidate index for the physical downlink control channel candidate index and an aggregation level of a physical downlink control channel candidate; means for determining a physical uplink control channel resource within the physical uplink control channel resource subset for hybrid automatic repeat request ACKnowledgement feedback based on the unique candidate index, a user-specific offset and a number of PUCCH resources within the physical uplink control channel resource subset; and means for transmitting a hybrid automatic repeat request ACKnowledgement on the determined physical uplink control channel resource.

In accordance with one aspect, an example embodiment may be provided in an apparatus comprising at least one processor; and at least one non-transitory memory including computer program code, the at least one non-transitory memory and the computer program code configured to, with the at least one processor, cause the apparatus to: based, at least partially, upon receipt of a downlink assignment, extract an ACKnowledgment resource indicator from the received downlink assignment; determine a physical uplink control channel resource subset from the extracted ACKnowledgment resource indicator; determine a physical downlink control channel candidate index in a search-space-set in a control-resource set where the downlink assignment has been decoded; determine a unique candidate index for the physical downlink control channel candidate index and an aggregation level of a physical downlink control channel candidate; determine a physical uplink control channel resource within the physical uplink control channel resource subset for hybrid automatic repeat request ACKnowledgement feedback based on the unique candidate index, a user-specific offset, and a number of PUCCH resources within the physical uplink control channel resource subset; and cause transmission of the hybrid automatic repeat request ACKnowledgement on the determined physical uplink control channel resource.

In accordance with one aspect, an example embodiment may be provided in a non-transitory program storage device readable by a machine, tangibly embodying a program of instructions executable by the machine for performing operations, such as 120, 125 and 123 shown in FIG. 1 for example, the operations comprising: based, at least partially, upon receipt of a downlink assignment, extracting an ACKnowledgment resource indicator from the received downlink assignment; determining a physical uplink control channel resource subset from the extracted ACKnowledgment resource indicator; determining a physical downlink control channel candidate index in a search-space-set in a control-resource set where the downlink assignment has been decoded; determining a unique candidate index for the physical downlink control channel candidate index and an aggregation level of a physical downlink control channel candidate; determining a physical uplink control channel resource within the physical uplink control channel resource subset for hybrid automatic repeat request ACKnowledgement feedback based on the unique candidate index, a user-specific offset, and a number of PUCCH resources within the physical uplink control channel resource subset; and causing transmission of a hybrid automatic repeat request ACKnowledgement on the determined physical uplink control channel resource.

In another example method, the following aspects may be performed at the base station or network element:
selecting ARI and determining PUCCH resource subset;
determining the unique indices m' given the m and AL of one or more PDCCH candidates in search-space-set s in CORESET p;
determining for each of one or more PDCCH candidates the PUCCH resource within the PUCCH resource subset for HARQ-ACK feedback given m', user-specific offset Y and number of PUCCH resources within a physical uplink control channel resource subset;
selecting PUCCH resource within the PUCCH resource subset and determine PDCCH candidate to transmit DL assignment based on the selected PUCCH resource (these steps may be done as a joint optimization);
transmitting DL assignment including ARI on the determined PDCCH candidate; and
receiving HARQ-ACK feedback on the selected PUCCH resource.

Figure 11:
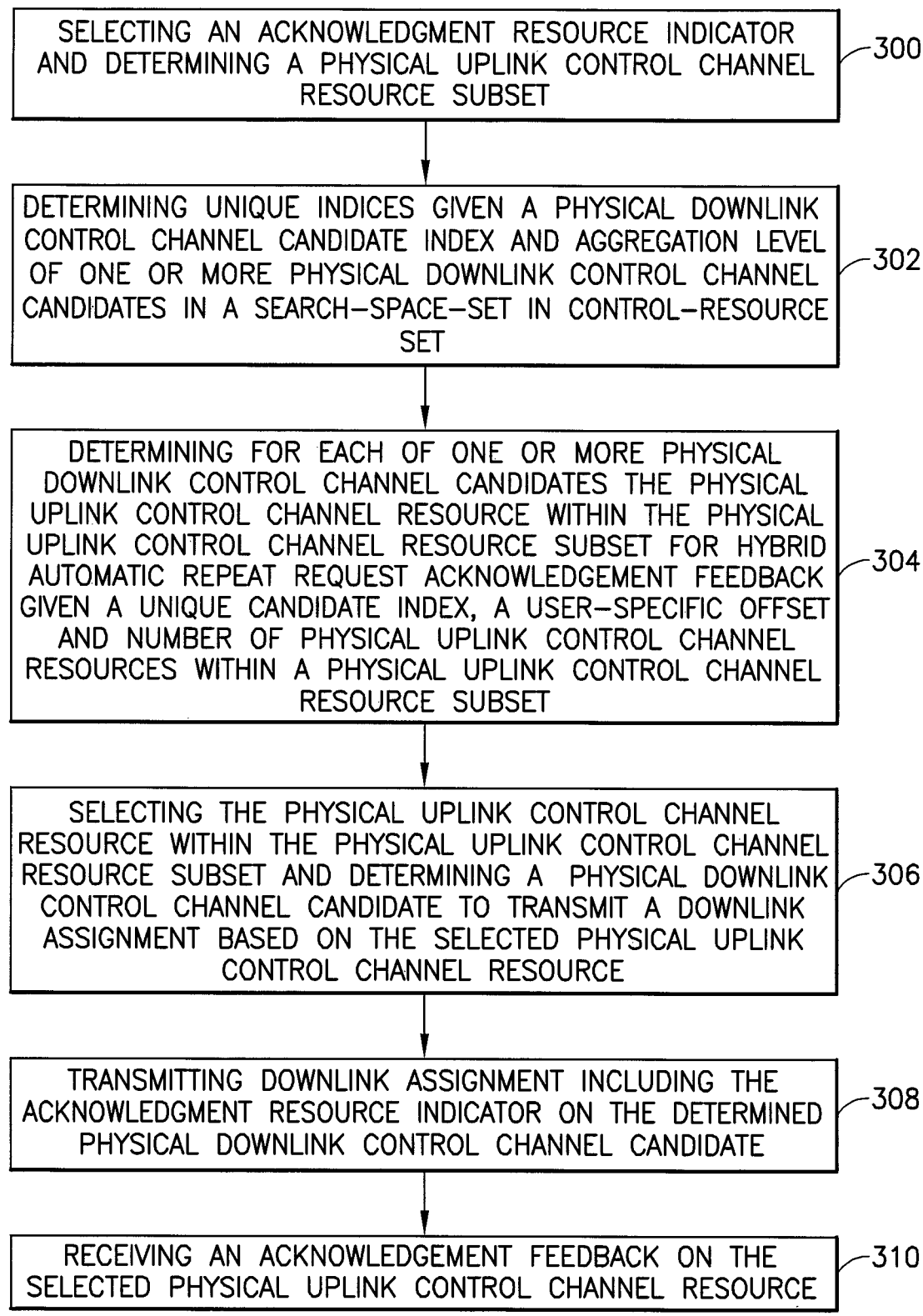
FIG. 11 is a diagram illustrating one example method.

Referring also to FIG. 11, one example method may comprise selecting an ACKnowledgment resource indicator and determining a physical uplink control channel resource subset as indicated by block 300; determining unique indices given a physical downlink control channel candidate index and aggregation level of one or more physical downlink control channel candidates in search-space-set in control-resource set p as indicated by block 302; determining for each of one or more physical downlink control channel candidates the physical uplink control channel resource within the physical uplink control channel resource subset for hybrid automatic repeat request ACKnowledgement feedback given the unique index, user-specific offset and number of physical uplink control channel resources within a physical uplink control channel resource subset as indicated by block 304; selecting the physical uplink control channel resource within the physical uplink control channel resource subset and determining a physical downlink control channel candidate to transmit a downlink assignment based on the selected physical uplink control channel resource as indicated by block 306; transmitting downlink assignment including the ACKnowledgment resource Indicator on the determined physical downlink control channel candidate as indicated by block 308; and receiving an ACKnowledgement feedback on the selected physical uplink control channel resource as indicated by block 310.

In accordance with one aspect, an example embodiment may be provided in an apparatus comprising: means for selecting an ACKnowledgment resource indicator and determining a physical uplink control channel resource subset; means for determining unique indices based upon the physical downlink control channel candidate index and an aggregation level of one or more physical downlink control channel candidates in a search-space-set in a control-resource set; means for determining for each of the one or more physical downlink control channel candidates a physical uplink control channel resource within the physical uplink control channel resource subset for hybrid automatic repeat request ACKnowledgement feedback based on the unique index, a user-specific offset and a number of physical uplink control channel resources within a physical uplink control channel resource subset; means for selecting the physical uplink control channel resource within the physical uplink control channel resource subset and determining a physical downlink control channel candidate to transmit a downlink assignment based on the selected physical uplink control channel resource; means for transmitting downlink assignment, including the ACKnowledgment resource indicator, on the determined physical downlink control channel candidate; and means for receiving an ACKnowledgement feedback on the selected physical uplink control channel resource.

In accordance with one aspect, an example embodiment may be provided in an apparatus comprising: at least one processor; and at least one non-transitory memory including computer program code, the at least one non-transitory memory and the computer program code configured to, with the at least one processor, cause the apparatus to: select an ACKnowledgment resource indicator and determine a physical uplink control channel resource subset; determine unique indices based upon a physical downlink control channel candidate index and an aggregation level of one or more physical downlink control channel candidates in a search-space-set in a control-resource set; determine for each of the one or more physical downlink control channel candidates a physical uplink control channel resource within the physical uplink control channel resource subset for hybrid automatic repeat request ACKnowledgement feedback based on the unique index, a user-specific offset, and a number of physical uplink control channel resources within the physical uplink control channel resource subset; select the physical uplink control channel resource within the physical uplink control channel resource subset and determining a physical downlink control channel candidate to transmit a downlink assignment based on the selected physical uplink control channel resource; cause transmission of the downlink assignment, including the ACKnowledgment resource indicator, on the determined physical downlink control channel candidate; and allow receipt of an ACKnowledgement feedback on the selected physical uplink control channel resource.

In accordance with one aspect, an example embodiment may be provided in a non-transitory program storage device readable by a machine, tangibly embodying a program of instructions executable by the machine for performing operations, such as 152, 153 and 155 shown in FIG. 1 for example, the operations comprising: selecting an ACKnowledgment resource indicator and determining a physical uplink control channel resource subset; determining unique indices based upon a physical downlink control channel candidate index and an aggregation level of one or more physical downlink control channel candidates in a search-space-set in a control-resource set; determining for each of the one or more physical downlink control channel candidates a physical uplink control channel resource within the physical uplink control channel resource subset for hybrid automatic repeat request ACKnowledgement feedback based on the unique index, a user-specific offset, and a number of physical uplink control channel resources within the physical uplink control channel resource subset; selecting a physical uplink control channel resource within the physical uplink control channel resource subset and determining a physical downlink control channel candidate to transmit a downlink assignment based on the selected physical uplink control channel resource; cause transmitting of the downlink assignment, including the ACKnowledgment resource indicator, on the determined physical downlink control channel candidate; and allow receiving of an ACKnowledgement feedback on the selected physical uplink control channel resource.

In another example method, the following aspects may be performed at the UE:
receiving DL assignment and extracting ARI and determining PUCCH resource subset from ARI;
determining the starting control channel element in CORESET p where DL assignment has been decoded;
separating the control channel elements in the CORESET p into one or more control channel element subsets, and determining an index for each subset, where the number of subsets depends on number of PUCCH resources in a PUCCH resource subset,
determining the PUCCH resource within the PUCCH resource subset for HARQ-ACK feedback based on the control channel element subset index including the starting control channel element;
transmitting the HARQ-ACK on the determined PUCCH resource.

One example method may comprise receiving a downlink assignment and extracting an ACKnowledgment resource indicator from the received downlink assignment; determining a physical uplink control channel resource subset from the extracted ACKnowledgment resource indicator; determining a starting control channel element in a search-space-set in a control-resource set where the downlink assignment has been decoded; separating control channel elements in the search-space-set in the control-resource set into one or more control channel element subsets, and determining an index for each of the one or more control channel element subsets, where a number of the one or more control channel element subsets depends on a number of physical uplink control channel resources in the physical uplink control channel resource subset; determining a physical uplink control channel resource within the physical uplink control channel resource subset for hybrid automatic repeat request ACKnowledgement feedback based on the control channel element subset index including the starting control channel element; and transmitting a hybrid automatic repeat request ACKnowledgement on the determined physical uplink control channel resource.

Another example embodiment may be provided in an apparatus comprising: means for receiving a downlink assignment and extracting an ACKnowledgment resource indicator from the received downlink assignment; means for determining a physical uplink control channel resource subset from the extracted ACKnowledgment resource indicator; means for determining a starting control channel element in a search-space-set in a control-resource set where the downlink assignment has been decoded; means for separating control channel elements in the search-space-set in the control-resource set into one or more control channel element subsets and determining an index for each of the one or more control channel element subsets, where a number of the one or more control channel element subsets depends on a number of physical uplink control channel resources in the physical uplink control channel resource subset; means for determining a physical uplink control channel resource within the physical uplink control channel resource subset for hybrid automatic repeat request ACKnowledgement feedback based on the control channel element subset index including the starting control channel element; and means for transmitting a hybrid automatic repeat request ACKnowledgement on the determined physical uplink control channel resource.

In accordance with one aspect, an example embodiment may be provided in an apparatus comprising: at least one processor; and at least one non-transitory memory including computer program code, the at least one non-transitory memory and the computer program code configured to, with the at least one processor, cause the apparatus to: based, at least partially, upon receipt of a downlink assignment, extract an ACKnowledgment resource indicator from the received downlink assignment; determine a physical uplink control channel resource subset from the extracted ACKnowledgment resource indicator; determine a starting control channel element in a search-space-set in a control-resource set where the downlink assignment has been decoded; separate control channel elements in the search-space-set in the control-resource set into one or more control channel element subsets, and determine an index for each of the one or more control channel element subsets, where a number of the one or more control channel element subsets depends on a number of physical uplink control channel resources in the physical uplink control channel resource subset; determine a physical uplink control channel resource within the physical uplink control channel resource subset for hybrid automatic repeat request ACKnowledgement feedback based on the control channel element subset index including the starting control channel element; and cause transmission of a hybrid automatic repeat request ACKnowledgement on the determined physical uplink control channel resource.

In accordance with one aspect, an example embodiment may be provided in a non-transitory program storage device readable by a machine, tangibly embodying a program of instructions executable by the machine for performing operations, such as 120, 125 and 123 shown in FIG. 1 for example, the operations comprising: based, at least partially, upon receipt of a downlink assignment, extracting an ACKnowledgment resource indicator from the received downlink assignment; determining a physical uplink control channel resource subset from the extracted ACKnowledgment resource indicator; determining a starting control channel element in a search-space-set in a control-resource set where the downlink assignment has been decoded; separating control channel elements in the search-space-set in the control-resource set into one or more control channel element subsets, and determining an index for each of the one or more control channel element subsets, where a number of the one or more control channel element subsets depends on a number of physical uplink control channel resources in the physical uplink control channel resource subset; determining a physical uplink control channel resource within the physical uplink control channel resource subset for hybrid automatic repeat request ACKnowledgement feedback based on the control channel element subset index including the starting control channel element; and cause transmitting of a hybrid automatic repeat request ACKnowledgement on the determined physical uplink control channel resource.

In another example method, the following aspects may be performed at the base station or network element:
  selecting ARI and determining PUCCH resource subset;
  separating the control channel elements in a CORESET into one or more control channel elements subsets, and determining an index for each subset, where the number of subsets depends on number of PUCCH resources in a PUCCH resource subset;
  determining for each of one or more PDCCH candidates the PUCCH resource in the PUCCH resource subset for HARQ-ACK feedback based on the subset index including the starting control channel element of the PDCCH candidate;
  selecting PUCCH resource within the PUCCH resource subset and determining PDCCH candidate to transmit DL assignment based on the selected PUCCH resource (these steps may be done as a joint optimization);
  transmitting DL assignment including ARI on the determined PDCCH candidate; and
  receiving HARQ-ACK feedback on the selected PUCCH resource.

One example method may comprise selecting an ACKnowledgment resource indicator and determining a physical uplink control channel resource subset; separating control channel elements in a search-space-set in a control-resource set into one or more control channel element subsets, and determining an index for each of the one or more control channel element subsets, where a number of the one or more control channel element subsets depends on a number of physical uplink control channel resources in the physical uplink control channel resource subset; determining for each of one or more physical downlink control channel candidates a physical uplink control channel resource in the physical uplink control channel resource subset for hybrid automatic repeat request ACKnowledgment feedback based on a control channel element subset index including a starting control channel element of the physical downlink control channel candidate; selecting a physical uplink control channel resource within the physical uplink control channel resource subset and determining a physical downlink control channel candidate to transmit a downlink assignment based on the selected physical uplink control channel resource; transmitting the downlink assignment, including the ACKnowledgment resource indicator, on the determined physical downlink control channel candidate; and receiving an ACKnowledgement feedback on the selected physical uplink control channel resource.

Another example embodiment may be provided in an apparatus comprising: means for selecting an ACKnowledgment resource indicator and determining a physical uplink control channel resource subset; means for separating control channel elements in a search-space-set in a control-resource set into one or more control channel element subsets and determining an index for each of the one or more control channel element subsets, where a number of the one or more control channel element subsets depends on a number of physical uplink control channel resources in the physical uplink control channel resource subset; means for determining for each of one or more physical downlink control channel candidates a physical uplink control channel resource in the physical uplink control channel resource subset for hybrid automatic repeat request ACKnowledgment feedback based on a control channel element subset index including a starting control channel element of the physical downlink control channel candidate; means for selecting a physical uplink control channel resource within the physical uplink control channel resource subset and determining a physical downlink control channel candidate to transmit a downlink assignment based on the selected physical uplink control channel resource; means for transmitting the downlink assignment, including the ACKnowledgment resource indicator, on the determined physical downlink control channel candidate; and means for receiving an ACKnowledgement feedback on the selected physical uplink control channel resource.

In accordance with one aspect, an example embodiment may be provided in an apparatus comprising: at least one processor; and at least one non-transitory memory including computer program code, the at least one non-transitory memory and the computer program code configured to, with the at least one processor, cause the apparatus to: select an ACKnowledgment resource indicator and determine a physical uplink control channel resource subset; separate control channel elements in a search-space-set in a control-resource set into one or more control channel element subsets, and determine an index for each of the one or more control channel element subsets, where a number of the one or more control channel element subsets depends on a number of physical uplink control channel resources in the physical uplink control channel resource subset; determine for each of one or more physical downlink control channel candidates a physical uplink control channel resource in the physical uplink control channel resource subset for hybrid automatic repeat request ACKnowledgement feedback based on a control channel element subset index including a starting control channel element of the physical downlink control channel candidate; select a physical uplink control channel resource within the physical uplink control channel resource subset and determine a physical downlink control channel candidate to transmit a downlink assignment based on the selected physical uplink control channel resource; cause transmitting of the downlink assignment, including the ACKnowledgment resource indicator, on the determined physical downlink control channel candidate; and allow receipt of an ACKnowledgement feedback on the selected physical uplink control channel resource.

In accordance with one aspect, an example embodiment may be provided in a non-transitory program storage device readable by a machine, tangibly embodying a program of instructions executable by the machine for performing operations, the operations comprising: selecting an ACKnowledgment resource indicator and determining a physical uplink control channel resource subset; separating control channel elements in a search-space-set in a control-resource set into one or more control channel element subsets, and determining an index for each of the one or more control channel element subsets, where a number of the one or more control channel element subsets depends on a number of physical uplink control channel resources in the physical uplink control channel resource subset; determining for each of one or more physical downlink control channel candidates a physical uplink control channel resource in the physical uplink control channel resource subset for hybrid automatic repeat request ACKnowledgment feedback based on a control channel element subset index including a starting control channel element of the physical downlink control channel candidate; selecting a physical uplink control channel resource within the physical uplink control channel resource subset and determining a physical downlink control channel candidate to transmit a downlink assignment based on the selected physical uplink control channel resource; cause transmitting of the downlink assignment, including the ACKnowledgment resource indicator, on the determined physical downlink control channel candidate; and allow receiving of an ACKnowledgement feedback on the selected physical uplink control channel resource.

In another example method, the following aspects may be performed at the base station or network element:
 selecting ARI and determining PUCCH resource subset;
 separating control channel elements in search-space-set s in CORESET p into one or more control channel element subsets, and determining an index for each subset;
 separating the control channel elements in CORESET p into of control channel element subsets, and determining an index for each subset, where the number of subsets depends on number of PUCCH resources in a PUCCH resource subset;
 determining, within each subset, unique indices m" given PDCCH candidate index m and aggregation level AL of one or more PDCCH candidates in CORESET p;
 determining for each of one or more PDCCH candidates the PUCCH resource within the PUCCH resource subset for HARQ-ACK feedback given the subset index, m", user-specific offset Y, and number of PUCCH resources within a physical uplink control channel resource subset;
 selecting PUCCH resource within the PUCCH resource subset and determine PDCCH candidate to transmit DL assignment based on the selected PUCCH resource (these steps may be done as a joint optimization);
 transmitting DL assignment including ARI on the determined PDCCH candidate; and
 receiving HARQ-ACK feedback on the selected PUCCH resource.

One example method may comprise selecting an ACKnowledgment resource indicator and determining a physical uplink control channel resource subset; separating control channel elements in a search-space-set in a control-resource set into one or more control channel element subsets, and determining an index for each of the one or more control channel element subsets, where a number of the one or more control channel element subsets depends on a number of physical uplink control channel resources in the physical uplink control channel resource subset; determining, within each of the one or more control channel element subsets, unique indices based upon a physical downlink control channel candidate index and an aggregation level of one or more candidates in the search-space-set in the control-resource set; determining for each of one or more physical downlink control channel candidates a physical uplink control channel resource in the physical uplink control channel resource subset for hybrid automatic repeat request ACKnowledgment feedback based on a control channel element subset index including a starting control channel element of the physical downlink control channel candidate, a unique index within the control channel element subset index including the starting control channel element of the physical downlink control channel candidate, a user-specific offset, and the number of physical uplink control channel resources in the physical uplink control channel resource subset; selecting a physical uplink control channel resource within the physical uplink control channel resource subset and determining a physical downlink control channel candidate to transmit a downlink assignment based on the selected physical uplink control channel resource; transmitting the downlink assignment, including the ACKnowledgment resource indicator, on the determined physical downlink control channel candidate; and receiving an ACKnowledgement feedback on the selected physical uplink control channel resource.

In accordance with one aspect, an example embodiment may be provided in an apparatus comprising: means for selecting an ACKnowledgment resource indicator and determining a physical uplink control channel resource subset; means for separating control channel elements in a search-space-set in a control-resource set into one or more control channel element subsets and determining an index for each of the one or more control channel element subsets, where a number of the one or more control channel element subsets depends on a number of physical uplink control channel resources in the physical uplink control channel resource subset; means for determining, within each of the one or more control channel element subsets, unique indices based upon a physical downlink control channel candidate index and an aggregation level of one or more candidates in the search-space-set in the control-resource set; means for determining for each of one or more physical downlink control channel candidates a physical uplink control channel resource in the physical uplink control channel resource subset for hybrid automatic repeat request ACKnowledgment feedback based on a control channel element subset index including a starting control channel element of the physical downlink control channel candidate, a unique index within the control channel element subset index including the starting control channel element of the physical downlink control channel candidate, a user-specific offset, and the number of physical uplink control channel resources in the physical uplink control channel resource subset; means for selecting a physical uplink control channel resource within the physical uplink control channel resource subset and determining a physical downlink control channel candidate to transmit a downlink assignment based on the selected physical uplink control channel resource; means for transmitting the downlink assignment, including the ACKnowledgment resource indicator, on the determined physical downlink control channel candidate; and means for receiving an ACKnowledgement feedback on the selected physical uplink control channel resource.

In accordance with one aspect, an example embodiment may be provided in an apparatus comprising: at least one processor; and at least one non-transitory memory including computer program code, the at least one non-transitory memory and the computer program code configured to, with the at least one processor, cause the apparatus to: select an ACKnowledgment resource indicator and determine a physical uplink control channel resource subset; separate control channel elements in a search-space-set in a control-resource set into one or more control channel element subsets, and determine an index for each of the one or more control channel element subsets, where a number of the one or more control channel element subsets depends on a number of physical uplink control channel resources in the physical uplink control channel resource subset; determine, within each of the one or more control channel element subsets, unique indices based upon a physical downlink control channel candidate index and an aggregation level of one or more candidates in the search-space-set in the control-resource set; determine for each of one or more physical downlink control channel candidates a physical uplink control channel resource in the physical uplink control channel resource subset for hybrid automatic repeat request ACKnowledgment feedback based on a control channel element subset index including a starting control channel element of the physical downlink control channel candidate, a unique index within the control channel element subset index including the starting control channel element of the physical downlink control channel candidate, a user-specific offset, and the number of physical uplink control channel resources in the physical uplink control channel resource subset; select a physical uplink control channel resource within the physical uplink control channel resource subset and determine a physical downlink control channel candidate to transmit a downlink assignment based on the selected physical uplink control channel resource; cause transmitting of the downlink assignment, including the ACKnowledgment resource indicator, on the determined physical downlink control channel candidate; and allow receipt of an ACKnowledgement feedback on the selected physical uplink control channel resource.

In accordance with one aspect, an example embodiment may be provided in a non-transitory program storage device readable by a machine, tangibly embodying a program of instructions executable by the machine for performing operations, such as 152, 153 and 155 shown in FIG. 1 for example, the operations comprising: selecting an ACKnowledgment resource indicator and determining a physical uplink control channel resource subset; separating control channel elements in a search-space-set in a control-resource set into one or more control channel element subsets, and determining an index for each of the pone or more control channel element subsets, where a number of the one or more control channel element subsets depends on a number of physical uplink control channel resources in the physical uplink control channel resource subset; determining, within each of the one or more control channel element subsets, unique indices based upon a physical downlink control channel candidate index and an aggregation level of one or more candidates in the search-space-set in the control-resource set; determining for each of one or more physical downlink control channel candidates a physical uplink control channel resource in the physical uplink control channel resource subset for hybrid automatic repeat request ACKnowledgment feedback based on a control channel element subset index including a starting control channel element of the physical downlink control channel candidate, a unique index within the control channel element subset index including the starting control channel element of the physical downlink control channel candidate, a user-specific offset, and the number of physical uplink control channel resources in the physical uplink control channel resource subset; selecting a physical uplink control channel resource within the physical uplink control channel resource subset and determining a physical downlink control channel candidate to transmit a downlink assignment based on the selected physical uplink control channel resource; cause transmitting of the downlink assignment, including the ACKnowledgment resource indicator, on the determined physical downlink control channel candidate; and allow receiving of an ACKnowledgement feedback on the selected physical uplink control channel resource.

In another example method, the following aspects may be performed at the UE:
receiving DL assignment and extracting ARI and determining PUCCH resource subset from ARI;
determining the PDCCH candidate index m and the starting control channel element search-space-set s in CORESET p where DL assignment has been decoded;
separating the control channel elements in the search-space-set s in the CORESET p into one or more control channel element subsets, and determining an index for each subset, where the number of subsets depends on number of PUCCH resources in a PUCCH resource subset;
determining, within each subset, unique candidate indices m" given PDCCH candidate index m and aggregation level AL of one or more PDCCH candidates in CORESET p;
determining the PUCCH resource within the PUCCH resource subset for HARQ-ACK feedback based on the control channel element subset index including the starting control channel element, unique candidate index m", a user-specific offset Y, and number of PUCCH resources within a PUCCH resource subset; and
transmitting the HARQ-ACK on the determined PUCCH resource.

One example method may comprise receiving a downlink assignment and extracting an ACKnowledgment resource indicator from the received downlink assignment; determining a physical uplink control channel resource subset from the extracted ACKnowledgment resource indicator; determining a physical downlink control channel candidate index and a starting control channel element in a search-space-set in a control-resource set where the downlink assignment has been decoded; separating control channel elements in the search-space-set in the control-resource set into one or more control channel element subsets, and determining an index for each of the one or more control channel element subsets, where a number of the one or more control channel element subsets depends on a number of physical uplink control channel resources in the physical uplink control channel resource subset; determining, within each of the one or more control channel element subsets, a unique candidate index for the physical downlink control channel candidate index and an aggregation level of a physical downlink control channel candidate; determining a physical uplink control channel resource within the physical uplink control channel resource subset for hybrid automatic repeat request ACKnowledgement feedback based on a control channel element subset index including the starting control channel element, a unique candidate index within the control channel element subset index including the starting control channel element of the physical downlink control channel candidate, a user-specific offset, and the number of physical uplink control channel resources within the physical uplink control channel resource subset; and transmitting a hybrid automatic repeat request ACKnowledgement on the determined physical uplink control channel resource.

In accordance with one aspect, an example embodiment may be provided in an apparatus comprising means for receiving a downlink assignment and extracting an ACKnowledgment resource indicator from the received downlink assignment; means for determining a physical uplink control channel resource subset from the extracted ACKnowledgment resource indicator; means for determining a physical downlink control channel candidate index and a starting control channel element in a search-space-set in a control-resource set where the downlink assignment has been decoded; means for separating control channel elements in the search-space-set in the control-resource set into one or more control channel element subsets and determining an index for each of the one or more control channel element subsets, where a number of the one or more control channel element subsets depends on a number of physical uplink control channel resources in the physical uplink control channel resource subset; means for determining, within each of the one or more control channel element subsets, a unique candidate index for the physical downlink control channel candidate index and an aggregation level of a physical downlink control channel candidate; means for determining a physical uplink control channel resource within the physical uplink control channel resource subset for hybrid automatic repeat request ACKnowledgement feedback based on a control channel element subset index including the starting control channel element, a unique candidate index within the control channel element subset index including the starting control channel element of the physical downlink control channel candidate, a user-specific offset, and the number of physical uplink control channel resources within the physical uplink control channel resource subset; and means for transmitting a hybrid automatic repeat request ACKnowledgement on the determined physical uplink control channel resource.

In accordance with one aspect, an example embodiment may be provided in an apparatus comprising at least one processor; and at least one non-transitory memory including computer program code, the at least one non-transitory memory and the computer program code configured to, with the at least one processor, cause the apparatus to: based, at least partially, upon receipt of a downlink assignment, extract an ACKnowledgment resource indicator from the received downlink assignment; determine a physical uplink control channel resource subset from the extracted ACKnowledgment resource indicator; determine a physical downlink control channel candidate index and a starting control channel element in a search-space-set in a control-resource set where the downlink assignment has been decoded; separate control channel elements in the search-space-set in the control-resource set into one or more control channel element subsets and determine an index for each of the one or more control channel element subsets, where a number of the one or more control channel element subsets depends on a number of physical uplink control channel resources in the physical uplink control channel resource subset; determine, within each of the one or more control channel element subsets, a unique candidate index for the physical downlink control channel candidate index and an aggregation level of a physical downlink control channel candidate; determine a physical uplink control channel resource within the physical uplink control channel resource subset for hybrid automatic repeat request ACKnowledgement feedback based on a control channel element subset index including the starting control channel element, a unique candidate index within the control channel element subset index including the starting control channel element of the physical downlink control channel candidate, a user-specific offset, and the number of physical uplink control channel resources within the physical uplink control channel resource subset; and cause transmission of a hybrid automatic repeat request ACKnowledgement on the determined physical uplink control channel resource.

In accordance with one aspect, an example embodiment may be provided in a non-transitory program storage device readable by a machine, tangibly embodying a program of instructions executable by the machine for performing operations, such as 120, 125 and 123 shown in FIG. 1 for example, the operations comprising: based, at least partially, upon receipt of a downlink assignment, extracting an ACKnowledgment resource indicator from the received downlink assignment; determining a physical uplink control channel resource subset from the extracted ACKnowledgment resource indicator; determining a physical downlink control channel candidate index and a starting control channel element in a search-space-set in a control-resource set where the downlink assignment has been decoded; separating control channel elements in the search-space-set in the control-resource set into one or more control channel element subsets, and determining an index for each of the one or more control channel element subsets, where a number of the one or more control channel element subsets depends on a number of physical uplink control channel resources in the physical uplink control channel resource subset; determining, within each of the one or more control channel element subsets, a unique candidate index for the physical downlink control channel candidate index and an aggregation level of a physical downlink control channel candidate; determining a physical uplink control channel resource within the physical uplink control channel resource subset for hybrid automatic repeat request ACKnowledgement feedback based on a control channel element subset index including the starting control channel element, a unique candidate index within the control channel element subset index including the starting control channel element of the physical downlink control channel candidate, a user-specific offset, and the number of physical uplink control channel resources within the physical uplink control channel resource subset; and cause transmitting of a hybrid automatic repeat request ACKnowledgement on the determined physical uplink control channel resource.

In accordance with some or all of the example embodiments as described in the paragraphs above, where the search-space-set is determined based on one of a format of downlink control information; a format size of the downlink control information; a radio network temporary identifier used for cyclic redundancy check; or an identifier carried in the downlink control information.

In accordance with some or all of the example embodiments as described in the paragraphs above, where determining the unique indices comprises beginning at a highest aggregation level.

In accordance with some or all of the example embodiments as described in the paragraphs above, where determining the unique indices comprises beginning at a lowest aggregation level.

In accordance with some or all of the example embodiments as described in the paragraphs above, where selecting the physical uplink control channel resource within the physical uplink control channel resource subset comprises determining that a first physical uplink control channel resource within the physical uplink control channel resource subset is occupied.

In accordance with some or all of the example embodiments as described in the paragraphs above, where the unique indices are determined based, at least partially, on priorities of the one or more physical downlink control channel candidates.

In accordance with some or all of the example embodiments as described in the paragraphs above, where the user-specific offset is a non-zero value.

In accordance with some or all of the example embodiments as described in the paragraphs above, where the user-specific offset is zero.

In accordance with some or all of the example embodiments as described in the paragraphs above, where the unique indices are unique within the search-space-set.

In accordance with some or all of the example embodiments as described in the paragraphs above, further comprising determining a band-specific offset for each control channel element subset, where determining for each of the one or more physical downlink control channel candidates the physical uplink control channel resource in the physical uplink control channel resource subset for hybrid automatic repeat request ACKnowledgment feedback is further based on a band-specific offset of the control channel element subset index including the starting control channel element of the physical downlink control channel candidate.

In accordance with some or all of the example embodiments as described in the paragraphs above, where the unique indices are determined based, at least partially, on a number of the one or more physical downlink control channel candidates that are mapped.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   receiving a downlink assignment and extracting an ACKnowledgment resource indicator from the received downlink assignment;
   determining a physical uplink control channel resource subset from the extracted ACKnowledgment resource indicator, wherein the determined physical uplink control channel resource subset comprises a plurality of physical uplink control channel resources;
   determining a starting control channel element in a search-space-set in a control-resource set where the downlink assignment has been decoded;
   separating control channel elements in the search-space-set in the control-resource set into one or more control channel element subsets, wherein the separating of the control channel elements in the search-space-set in the control-resource set into the one or more control channel element subsets is based on:
      a number of control channel elements in the search-space-set,
      a number of the plurality of physical uplink control channel resources in the determined physical uplink control channel resource subset, and
      a number of control channel elements associated with aggregation levels of the search-space-set;
   determining an index for each of the one or more control channel element subsets, where a number of the one or more control channel element subsets is equal to the number of the plurality of physical uplink control channel resources in the determined physical uplink control channel resource subset;
   determining a physical uplink control channel resource within the determined physical uplink control channel resource subset for hybrid automatic repeat request ACKnowledgement feedback based on a control channel element subset index including the starting control channel element; and
   transmitting a hybrid automatic repeat request ACKnowledgement on the determined physical uplink control channel resource.

2. The method of claim 1, where the search-space-set is determined based on one of:
   a format of downlink control information;
   a format size of the downlink control information;
   a radio network temporary identifier used for cyclic redundancy check; or
   an identifier carried in the downlink control information.

3. The method of claim 1, wherein the one or more control channel element subsets respectively comprise a plurality of control channel elements.

4. The method of claim 1, wherein the one or more control channel element subsets respectively comprise control channel elements from at least two different aggregation levels of the search-space-set in the control-resource set.

5. The method of claim 1, wherein the one or more control channel element subsets comprise at least two control channel element subsets.

6. An apparatus comprising:
   means for receiving a downlink assignment and extracting an ACKnowledgment resource indicator from the received downlink assignment;
   means for determining a physical uplink control channel resource subset from the extracted ACKnowledgment resource indicator, wherein the determined physical uplink control channel resource subset comprises a plurality of physical uplink control channel resources;

means for determining a starting control channel element in a search-space-set in a control-resource set where the downlink assignment has been decoded;

means for separating control channel elements in the search-space-set in the control-resource set into one or more control channel element subsets, wherein the separating of the control channel elements in the search-space-set in the control-resource set into the one or more control channel element subsets is based on:
  a number of control channel elements in the search-space-set,
  a number of the plurality of physical uplink control channel resources in the determined physical uplink control channel resource subset, and
  a number of control channel elements associated with aggregation levels of the search-space-set;

determining an index for each of the one or more control channel element subsets, where a number of the one or more control channel element subsets is equal to the number of the plurality of physical uplink control channel resources in the determined physical uplink control channel resource subset;

means for determining a physical uplink control Channel resource within the determined physical uplink control channel resource subset for hybrid automatic repeat request ACKnowledgement feedback based on a control channel element subset index including the starting control channel element; and means for transmitting a hybrid automatic repeat request ACKnowledgement on the determined physical uplink control channel resource.

7. The apparatus of claim 6, where the search-space-set is determined based on one of:
  a format of downlink control information;
  a format size of the downlink control information;
  a radio network temporary identifier used for cyclic redundancy check; or
  an identifier carried in the downlink control information.

8. The apparatus of claim 6, wherein the one or more control channel element subsets respectively comprise a plurality of control channel elements.

9. The apparatus of claim 6, wherein the one or more control channel element subsets respectively comprise control channel elements from at least two different aggregation levels of the search-space-set in the control-resource set.

10. The apparatus of claim 6, wherein the one or more control channel element subsets comprise at least two control channel element subsets.

11. A method comprising:
selecting an ACKnowledgment resource indicator and determining a physical uplink control channel resource subset, wherein the determined physical uplink control channel resource subset comprises a plurality of physical uplink control channel resources;

separating control channel elements in a search-space-set in a control-resource set into one or more control channel element subsets, wherein the separating of the control channel elements in the search-space-set in the control-resource set into the one or more control channel element subsets is based on:
  a number of control channel elements in the search-space-set,
  a number of the plurality of physical uplink control channel resources in the determined physical uplink control channel resource subset, and
  a number of control channel elements associated with aggregation levels of the search-space-set;

determining an index for each of the one or more control channel element subsets, where a number of the one or more control channel element subsets is equal to the number of the plurality of physical uplink control channel resources in the determined physical uplink control channel resource subset;

determining for each of one or more physical downlink control channel candidates a physical uplink control channel resource in the determined physical uplink control channel resource subset for hybrid automatic repeat request ACKnowledgment feedback based on:
  a control channel element subset index including a starting control channel element of the physical downlink control channel candidate;

selecting a physical uplink control channel resource within the determined physical uplink control channel resource subset and determining a physical downlink control channel candidate to transmit a downlink assignment based on the selected physical uplink control channel resource;

transmitting the downlink assignment, including the ACKnowledgment resource indicator, on the determined physical downlink control channel candidate; and receiving an ACKnowledgement feedback on the selected physical uplink control channel resource.

12. The method of claim 11, where selecting the physical uplink control channel resource within the determined physical uplink control channel resource subset comprises determining that a first physical uplink control channel resource within the determined physical uplink control channel resource subset is occupied.

13. An apparatus comprising:
means for selecting an ACKnowledgment resource indicator and determining a physical uplink control channel resource subset, wherein the determined physical uplink control channel resource subset comprises a plurality of physical uplink control channel resources;

means for separating control channel elements in a search-space-set in a control-resource set into one or more control channel element subsets, wherein the separating of the control channel elements in the search-space-set in the control-resource set into the one or more control channel element subsets is based on:
  a number of control channel elements in the search-space-set,
  a number of the plurality of physical uplink control channel resources in the determined physical uplink control channel resource subset, and
  a number of control channel elements associated with aggregation levels of the search-space-set;

determining an index for each of the one or more control channel element subsets, where a number of the one or more control channel element subsets is equal to the number of the plurality of physical uplink control channel resources in the determined physical uplink control channel resource subset;

means for determining for each of one or more physical downlink control channel candidates a physical uplink control channel resource in the determined physical uplink control channel resource subset for hybrid automatic repeat request ACKnowledgment feedback based on:
  a control channel element subset index including a starting control channel element of the physical downlink control channel candidate;

means for selecting a physical uplink control channel resource within the determined physical uplink control channel resource subset and determining a physical downlink control channel candidate to transmit a downlink assignment based on the selected physical uplink control channel resource;

means for transmitting the downlink assignment, including the ACKnowledgment resource indicator, on the determined physical downlink control channel candidate; and means for receiving an ACKnowledgement feedback on the selected physical uplink control channel resource.

14. The apparatus of claim 13, where selection of the physical uplink control channel resource within the determined physical uplink control channel resource subset comprises causing the apparatus to determine that a first physical uplink control channel resource within the determined physical uplink control channel resource subset is occupied.

* * * * *